United States Patent
Hayakawa

(10) Patent No.: US 9,478,068 B2
(45) Date of Patent: Oct. 25, 2016

(54) COMPUTER-READABLE MEDIUM, IMAGE PROCESSING DEVICE, IMAGE PROCESSING SYSTEM, AND IMAGE PROCESSING METHOD

(71) Applicant: NINTENDO CO., LTD., Kyoto (JP)

(72) Inventor: Takeshi Hayakawa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 261 days.

(21) Appl. No.: 13/934,736

(22) Filed: Jul. 3, 2013

(65) Prior Publication Data
US 2014/0092133 A1    Apr. 3, 2014

(30) Foreign Application Priority Data
Oct. 2, 2012 (JP) .................................. 2012-220353

(51) Int. Cl.
G06T 19/00    (2011.01)
G06T 19/20    (2011.01)

(52) U.S. Cl.
CPC ............. *G06T 19/006* (2013.01); *G06T 19/20* (2013.01)

(58) Field of Classification Search
CPC .............................. G06T 19/006; G06T 19/20
USPC ......................................................... 345/633
See application file for complete search history.

(56) References Cited

U.S. PATENT DOCUMENTS

| | | | | |
|---|---|---|---|---|
| 6,721,011 B1 * | 4/2004 | Hatakenaka | ......... | H04N 1/0035 348/333.01 |
| 2004/0051744 A1 * | 3/2004 | Fukui et al. | .................. | 345/848 |
| 2009/0262113 A1 * | 10/2009 | Kotake | ................ | G02B 27/017 345/427 |
| 2011/0173550 A1 * | 7/2011 | Oetzel | ............................ | 715/757 |
| 2011/0304647 A1 * | 12/2011 | Noge | .................... | G06T 19/006 345/633 |
| 2012/0094773 A1 * | 4/2012 | Suzuki | ............................ | 463/43 |

FOREIGN PATENT DOCUMENTS

JP    2007-286715 A    1/2007

OTHER PUBLICATIONS

Kato et al., "An Augumented Reality System and its Calibration based on Marker Tracking" TVRSJ, 1999, vol. 4, No. 4.*
Kato et al., "An Augumented Reality System and its Calibration based on Marker Tracking" *TVRSJ*, 1999, vol. 4, No. 4, partial translation attached, 11 pages.
Kanbara et al., Development of a Vision-based Augmented Reality System with a Wide Range of Registration. Proceedings of the Virtual Reality Society of Japan, 4th Annual Conference 1999, pp. 257-260 partial translation of p. 258, left column, line 12 to p. 259, right column, line 9.

* cited by examiner

*Primary Examiner* — Devona Faulk
*Assistant Examiner* — Hai Tao Sun
(74) *Attorney, Agent, or Firm* — Nixon & Vanderhye, P.C.

(57) ABSTRACT

An example system causes a computer to function as: a display reference information updating unit which updates at least any of a position and a posture of a virtual object in a virtual space based on information obtained from a real space; an image generating unit which generates an image of a virtual space including the virtual object; a display control unit which causes a display device to display an image so that the image of the virtual space is superimposed on the real space so as to be viewed by a user; and an update interrupting unit which interrupts an update of at least any of a position and a posture of the virtual object in the virtual space when predetermined conditions are met.

14 Claims, 5 Drawing Sheets

COMPUTER-READABLE MEDIUM, IMAGE PROCESSING DEVICE, IMAGE PROCESSING SYSTEM, AND IMAGE PROCESSING METHOD

This application is based upon and claims the benefit of priority of the prior Japanese Patent Application No. JP2012-220353, filed on Oct. 2, 2012, the entire contents of which are incorporated herein by reference.

FIELD

The present disclosure relates to an image processing program, an image processing device, an image processing system, and an image processing method for superimposing various types of information on a real space.

BACKGROUND AND SUMMARY

The present disclosure adopts the following configuration as a solution to the problems described above. Specifically, one aspect of the present disclosure is a computer-readable medium recorded with a image processing program which causes a computer to function as: an updating unit to update, based on information obtained from a real space, at least any of a position and a posture, in a virtual space, of a virtual object arranged in the virtual space; an image generating unit to generate an image of a virtual space including the virtual object; a display control unit to cause a display device to display an image so that the image of the virtual space is superimposed on the real space so as to be viewed by a user; and an update interrupting unit to interrupt an update of at least any of a position and a posture, in the virtual space, of the virtual object when predetermined conditions are met.

In this case, the display device may be connected as a peripheral device to a computer that executes the program according to the present disclosure or may be connected to the computer via a communication network or the like. In addition, the computer that is mainly responsible for executing the program according to the present disclosure may be built on a virtual environment such as a so-called cloud.

According to the image processing program described above, since an update of the display reference information is interrupted when predetermined conditions are met, display reference information of a virtual object can be determined without being restricted by a position or a posture of a feature such as a marker. Therefore, a restriction imposed on the display of a virtual object by a feature in a real space in augmented reality techniques can be eased.

Moreover, application of the present disclosure is not limited to particular types of augmented reality techniques. For example, the present disclosure can be applied to an augmented reality technique which enables a user to view an image of a virtual space superimposed on a real space by displaying a composite image created by compositing a virtual space image on a captured image and to an augmented reality technique (head-up display: HUD or the like) which enables a user to view an image of a virtual space superimposed on a real space by projecting a virtual space image to a field of view of the user.

In addition, the image processing program may further comprise a feature detecting unit to detect a feature in a real space that enables at least any of a position and a posture in the real space to be identified, and the display reference information updating unit may update the display reference information stored by the display reference information storing unit based on the feature.

In this case, examples of a feature in a real space include a so-called AR marker or a code such as a two-dimensional barcode. Such a feature may be attached to a component such as a card. In addition, such a feature is not limited to a dedicated marker, a code, or the like. Even an article that is used for another purpose may be used as the feature as long as the article enables a display reference of a virtual object to be acquired.

In addition, the update interrupting unit may interrupt an update of the display reference information by the display reference information updating unit on the condition that a predetermined operation is performed by a user.

Accordingly, the user can specify a timing where the display reference information is fixed and a virtual object can be fixed with display reference information desired by the user. Moreover, in this case, a state where "a predetermined operation is performed" includes a state where the predetermined operation is currently being performed.

In addition, the image processing program may cause the computer to further function as a captured image acquiring unit to acquire a captured image that is captured by an imaging device, and the feature detecting unit may detect from the captured image a feature in a space captured in the captured image.

Furthermore, the display control unit may enable a user to view an image of the virtual space superimposed on a real space by causing the display device to display a composite image in which an image of the virtual space is superimposed on the captured image.

In addition, the image processing program may cause the computer to further function as a composite image preserving unit to preserve the composite image.

By enabling the composite image to be preserved in a state where display reference information is fixed, a composite image of a virtual object displayed according to display reference information desired by a user and a captured image can be preserved. In this case, the composite image that is preserved may be a still image or a moving image.

Furthermore, the composite image preserving unit may preserve the composite image in response to a user operation performed in order to issue an instruction for preserving an image.

By preserving a composite image in response to a user operation in a state where display reference information is fixed, a composite image of a virtual object displayed according to display reference information desired by a user and a captured image in an captured state desired by the user can be preserved.

In addition, the display reference information storing unit may store at least any of a position and a posture in the virtual object in the virtual space as the display reference information; the display reference information updating unit may update the display reference information based on the feature that enables any of a position and a posture in the real space to be identified; and the image generating unit may generate an image of a virtual space including the virtual object having at least any of a position and a posture determined based on the display reference information.

For example, display reference information is a reference indicating at least any of a position and a posture in a space whose image is captured. The display reference information may be, for example, a coordinate system having an origin and three axes thereof determined in accordance with a position and a posture of a marker, or position and posture information of a marker relative to an imaging device.

Moreover, the present disclosure can be considered as being an disclosure described as follows. Specifically, the present disclosure is an image processing program which causes a computer to function as: an updating unit to update, based on information obtained from a real space, at least any of a position and a posture, in a virtual space, of a virtual object arranged in the virtual space; an image generating unit to generate an image of a virtual space including the virtual object; a display control unit to cause a display device to display an image so that the image of the virtual space is superimposed on the real space so as to be viewed by a user; and an update interrupting unit to interrupt an update of at least any of a position and a posture, in the virtual space, of the virtual object when predetermined conditions are met.

In addition, the present disclosure can also be considered as being an information processing device, an information processing system having one or more information processing devices, a method that is executed by a computer, or a program to be executed on a computer. Furthermore, the present disclosure may be embodied by a recording medium which is readable by a device such as a computer, a machine, or the like and on which such a program is recorded. In this case, a recording medium that is readable by a computer or the like refers to a recording medium which accumulates information such as data and programs by an electric action, a magnetic action, an optical action, a mechanical action, or a chemical action and which can be read by a computer or the like.

DETAILED DESCRIPTION OF NON-LIMITING EXAMPLE EMBODIMENTS

Hereinafter, an embodiment of the present disclosure will be described with reference to the drawings. It should be noted that the embodiment described below merely represents an example of implementing the present disclosure and is not intended to limit the present disclosure to the specific configuration described below. When implementing the present disclosure, a specific configuration may be adopted as appropriate in accordance with each embodiment. For example, the present disclosure can be applied to an information processing program to be executed on a computer of a portable information processing device, an information processing device, an information processing system having one or more information processing devices, an information processing method, and the like.

<System Configuration>

Figure 1:
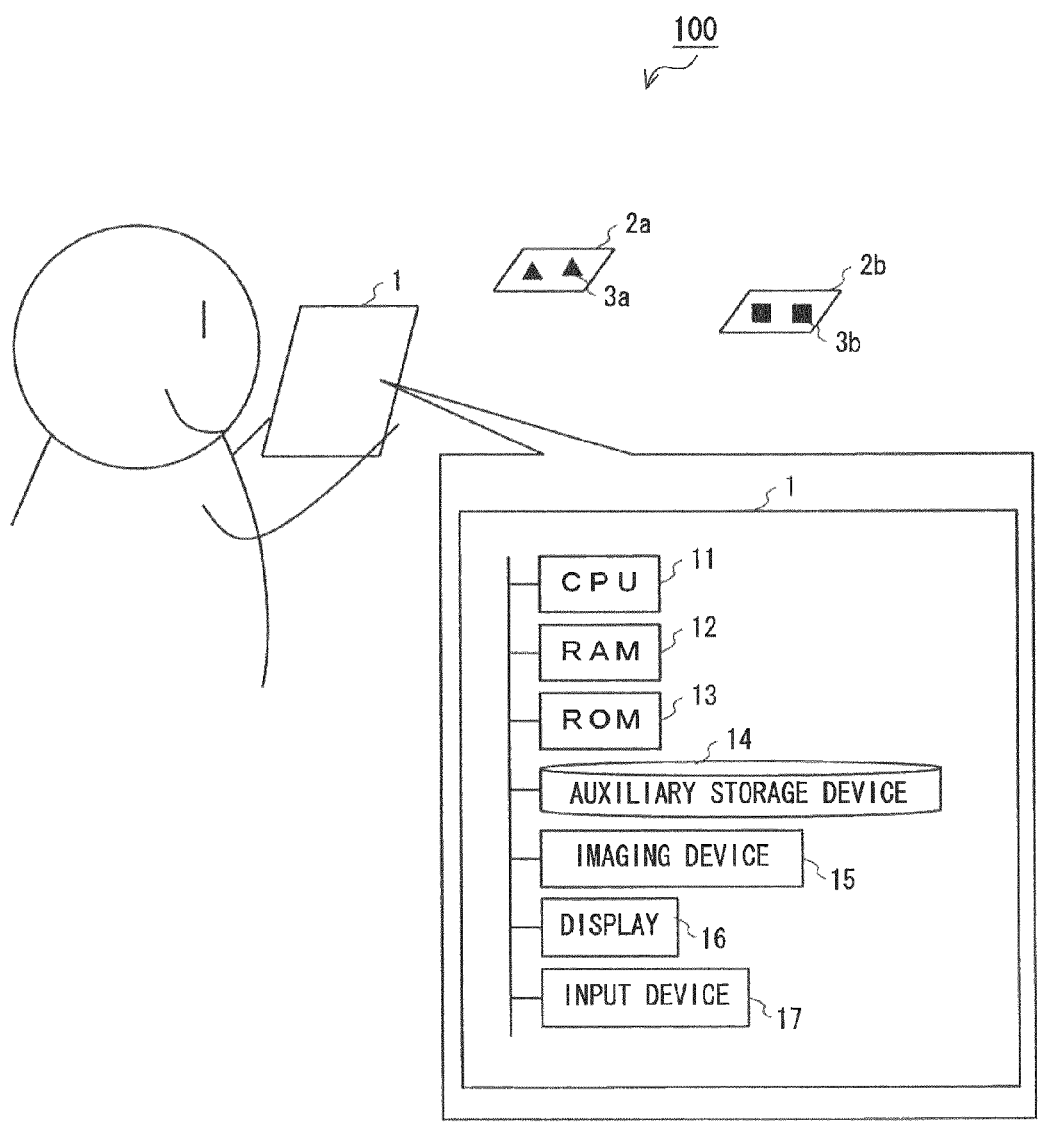
FIG. 1 shows an example non-limiting diagram showing an outline of a system including an information processing device.

FIG. 1 is a diagram showing a configuration of a system 100 according to the present embodiment. The system 100 comprises an information processing device 1 and a plurality of cards 2a and 2b (however, when types of cards are not distinguished, simply referred to as a "card 2").

The information processing device 1 is an information processing device to which a central processing unit (CPU) 11, a random access memory (RAM) 12, a read only memory (ROM) 13, an auxiliary storage device 14, an imaging device 15, a display 16, and an input device 17 constituted by various buttons, a touch screen, or the like are electrically connected. Moreover, components may be omitted, replaced, or added as appropriate according to each embodiment in a specific hardware configuration of the information processing device 1.

The CPU 11 is a central processing unit and controls the respective components of the information processing device 1 including the RAM 12 and the auxiliary storage device 14 by processing commands and data deployed on the RAM 12, the ROM 13, and the like. In addition, the RAM 12 is a primary storage device controlled by the CPU 11, and various instructions and data are written onto and read from the RAM 12. In other words, the CPU 11, the RAM 12, and the ROM 13 constitute a controller of the information processing device 1.

The auxiliary storage device 14 is a non-volatile storage device. Information that is desirably retained even after shutting down the information processing device 1 including an operating system (OS) of the information processing device 1 that is loaded onto the RAM 12, various programs for executing the processes described later, and various data to be used by the information processing device 1 are mainly written into and read from the auxiliary storage device 14. For example, an electrically erasable programmable ROM (EEPROM) or a hard disk drive (HDD) can be used as the auxiliary storage device 14. Alternatively, a portable medium that is detachably mounted to the information processing device 1 may be used as the auxiliary storage device 14. Examples of a portable medium include a memory card constituted by an EEPROM or the like, a compact disc (CD), a digital versatile disc (DVD), and a Blu-ray Disc (BD). Furthermore, a combination of an auxiliary storage device 14 constituted by a portable medium and a non-portable auxiliary storage device 14 can also be used.

Markers 3a and 3b (however, when types of markers are not distinguished, simply referred to as a "marker 3") which differ from each other in printing methods or the like are attached to the cards 2a and 2b. The marker 3 is associated with a virtual object displayed by the information processing device 1 and is an indicator representing a reference of a position and a posture when the virtual object associated with the marker 3 is displayed. While two cards 2 are shown in FIG. 1, there may be three or more cards 2. In addition, while markers 3a and 3b which differ from one another are attached to the cards 2a to 2b to display different virtual objects, cards 2 attached with a same marker may also be used.

In the present embodiment, a virtual object is composited and displayed at a predetermined position relative to the marker 3 associated with the virtual object on the display 16 of the information processing device 1. In addition, a virtual object has upward and downward, forward and backward, and leftward and rightward directions. Therefore, the marker 3 may enable a display posture of a virtual object to be identified. In other words, the marker 3 may be a symbol, a character, a graphic, a picture, or a combination thereof which enables a position and a posture relative to the imaging device 15 to be identified by being captured with the imaging device 15.

Next, functions possessed by the information processing device 1 according to the present embodiment will be described. The information processing device 1 according to the present embodiment is an information processing device having a so-called AR function. The information processing device 1 has a function of compositing a virtual object in a virtual space rendered using a virtual camera on a captured image of a real space captured using the imaging device 15, and displaying the virtual object composited on the captured image on the display 16. In the present embodiment, a virtual object is three-dimensional image data. However, a virtual object may alternatively be two-dimensional image data.

Figure 2:
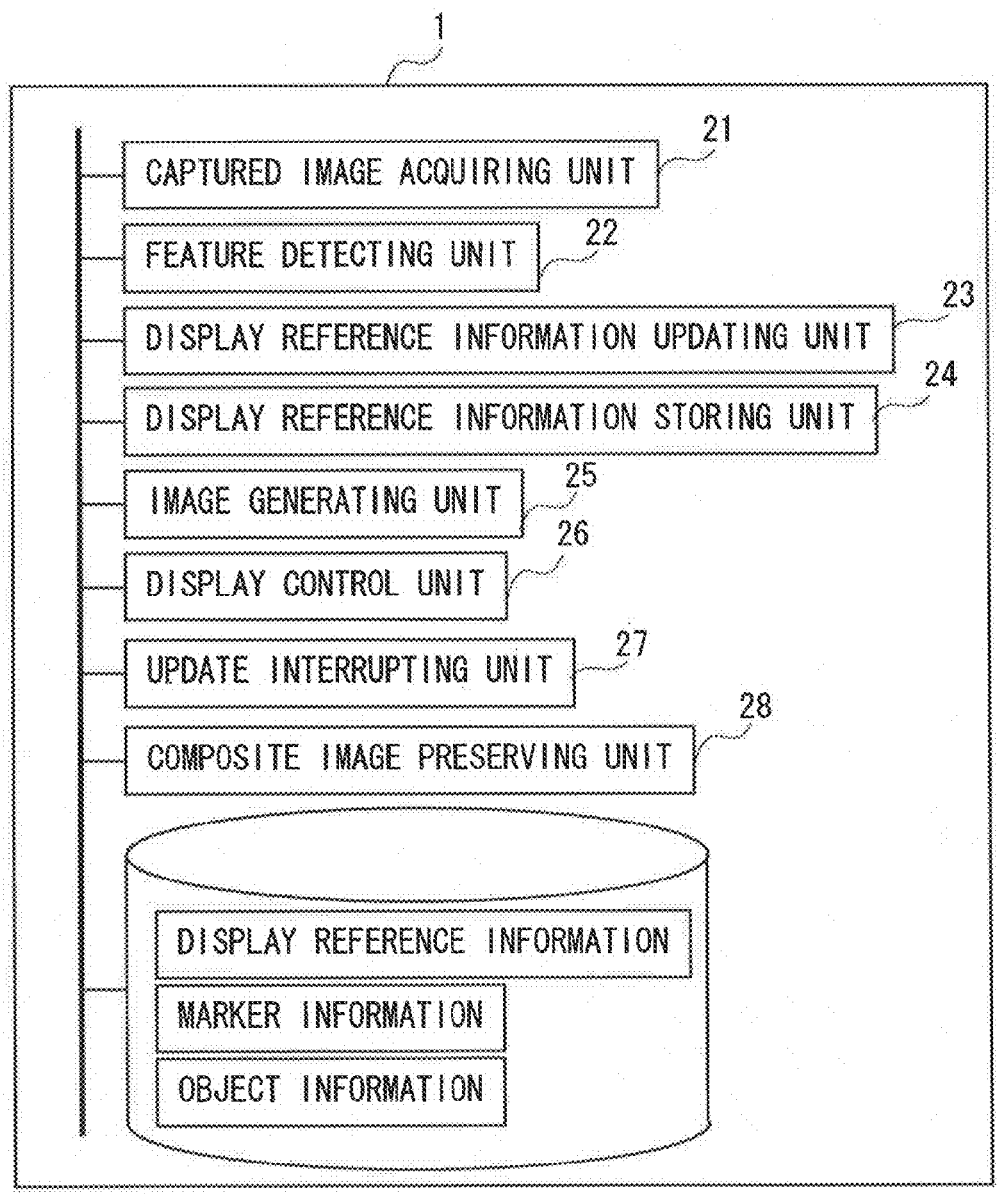
FIG. 2 shows an example non-limiting diagram showing an outline of a functional configuration of an information processing device.

FIG. 2 is a diagram showing an outline of a functional configuration of the information processing device 1 according to the present embodiment. Due to the CPU 11 interpreting and executing various programs deployed on the RAM 12, the information processing device 1 according to the present embodiment functions as an information processing device comprising a captured image acquiring unit 21, a feature detecting unit 22, a display reference information updating unit 23, a display reference information storing unit 24, an image generating unit 25, a display control unit 26, an update interrupting unit 27, and a composite image preserving unit 28. Although an example in which all of these functions are executed by a general-purpose CPU 11 is explained in the present embodiment, a part of or all of these functions may be realized by one or a plurality of dedicated processors.

The captured image acquiring unit 21 acquires a captured image that is captured by the imaging device 15. In addition, with respect to an image captured by the imaging device 15, the feature detecting unit 22 is capable of detecting a marker 3 included in the image by performing image processing such as pattern matching. For example, detection of the marker 3 is performed using an image recognition engine.

Based on the detected marker 3, the display reference information updating unit 23 acquires information that becomes a reference of a position and a posture in a space captured in the captured image and updates display reference information. In the present embodiment, even when a camera moves or the marker 3 is moved, display reference information stored by the display reference information storing unit 24 is updated according to a latest marker position and a latest marker posture relative to the camera.

The display reference information storing unit 24 stores display reference information for determining a position and a posture of a virtual object arranged in a virtual space. In the present embodiment, display reference information refers to a reference used to represent a position and a posture of a virtual object in a virtual space. However, display reference information may be a reference used to represent only one of a position and a posture of a virtual object in a virtual space. In a reference acquiring process according to the present embodiment, a marker coordinate system which has a center point of the marker 3 as an origin and which uses three axes perpendicular to one another is acquired as display reference information for each marker 3. However, information other than a marker coordinate system such as a captured image itself may alternatively be used as display reference information. In addition, a plurality of markers 3 can share one marker coordinate system. Defining a coordinate system of a virtual space using a marker 3 arranged in a real space as a reference enables the real space and the virtual space to be associated with each other.

Moreover, methods other than using a marker coordinate system may be adopted to associate a real space and a virtual space with each other.

In the present embodiment, a virtual object arranged in a virtual space is arranged in a marker coordinate system of the marker 3 with which the virtual object is associated. A marker coordinate system can be acquired by calculating a position and a posture of the marker 3 relative to the imaging device 15 based on an appearance of the marker 3 included in the captured image. A position and a posture of a virtual camera in a marker coordinate system are conformed to a position and a posture of the imaging device 15 in a real space. Therefore, when a virtual space is defined based on the marker 3 and a position or a capturing direction of the imaging device 15 is varied in the virtual space, an image of the virtual space displayed on the display 16 also varies.

The image generating unit 25 renders a virtual space image by arranging a virtual object whose position and posture are determined according to display reference information stored by the display reference information storing unit 24 in a virtual space and generating an image of a virtual space as seen from a virtual camera. Subsequently, due to the AR function described earlier, the information processing device 1 according to the present embodiment generates a composite image in which a captured image acquired by the captured image acquiring unit 21 and a virtual space image which includes a virtual object and which is generated by the image generating unit 25 are superimposed.

The display control unit 26 causes the generated composite image to be displayed by the display 16 that is a display device. Accordingly, a user can get a feeling that the virtual object actually exists in the real space.

When updating of display reference information is disabled, the update interrupting unit 27 interrupts an update of display reference information by the display reference information updating unit 23. Moreover, enabling/disabling update of display reference information can be switched based on a predetermined operation performed by the user. In addition, when a plurality of markers is detected and a plurality of pieces of display reference information is stored by the display reference information storing unit 24, none of the pieces of display reference information is updated as long as update of display reference information is disabled. Having such a function enables the information processing device 1 according to the present embodiment to disable update of display reference information of a virtual object which is updated based on the marker 3 once the display reference information reaches a state that is desirable to the user, adjust a capturing position or an angle with respect to a real space while update is being disabled, and obtain a composite image of the virtual object in a desired state and the real space in a desired state. The composite image preserving unit 28 preserves the composite image in response to a user operation performed in order to issue an instruction for preserving the image.

In this case, examples of a "predetermined operation" include pressing down on a predetermined button (in this case, update of display reference information remains disabled until a release operation is performed) and a predetermined button being pressed down (in this case, update of display reference information remains disabled as long as the predetermined button is pressed down).

Next, information retained by the information processing device 1 according to the present embodiment will be described. In addition to display reference information stored by the display reference information storing unit 24 described above, the information processing device 1 retains marker information and object information.

Marker information is information related to the marker 3. For example, marker information includes a marker ID for identifying the marker 3, a marker image, a marker size, an associated object ID, a position and a posture of a virtual object, and a display size of the object. A marker image is an image showing an exterior of the marker 3. In addition, a marker size is information indicating a size of the marker 3 such as vertical and horizontal lengths of the marker 3. Based on a marker image and a marker size, the display reference information updating unit 23 of the information processing device 1 is capable of acquiring a distance between the imaging device 15 and the marker 3, a posture of the marker 3, and the like or, in other words, position and posture information of the marker 3 and a marker coordinate system from an appearance of the marker 3 included in a captured image. The associated object ID is an identification number of a virtual object displayed at a position corresponding to the marker 3. Moreover, two or more virtual objects may be associated with one marker 3. In the present embodiment, marker information includes an object ID of a virtual object managed by a relevant marker coordinate system. A position and a posture of a virtual object are represented by a position (coordinate value) and a posture (vector) in a marker coordinate system. Marker information exists for each marker 3 used in the system 100.

Object information is information related to a virtual object displayed at a position corresponding to the marker 3. For example, object information includes an object ID for identifying the virtual object and object data. Object information exists for each object used in the system 100.

<Flow of Processing>

Next, a flow of processing executed in the present embodiment will be described. Moreover, specific contents and a processing sequence of processing shown in a flow chart according to the present embodiment merely represent an example of implementing the present disclosure. Specific processing contents and a processing sequence may be appropriately selected for each embodiment of the present disclosure.

Figure 3:
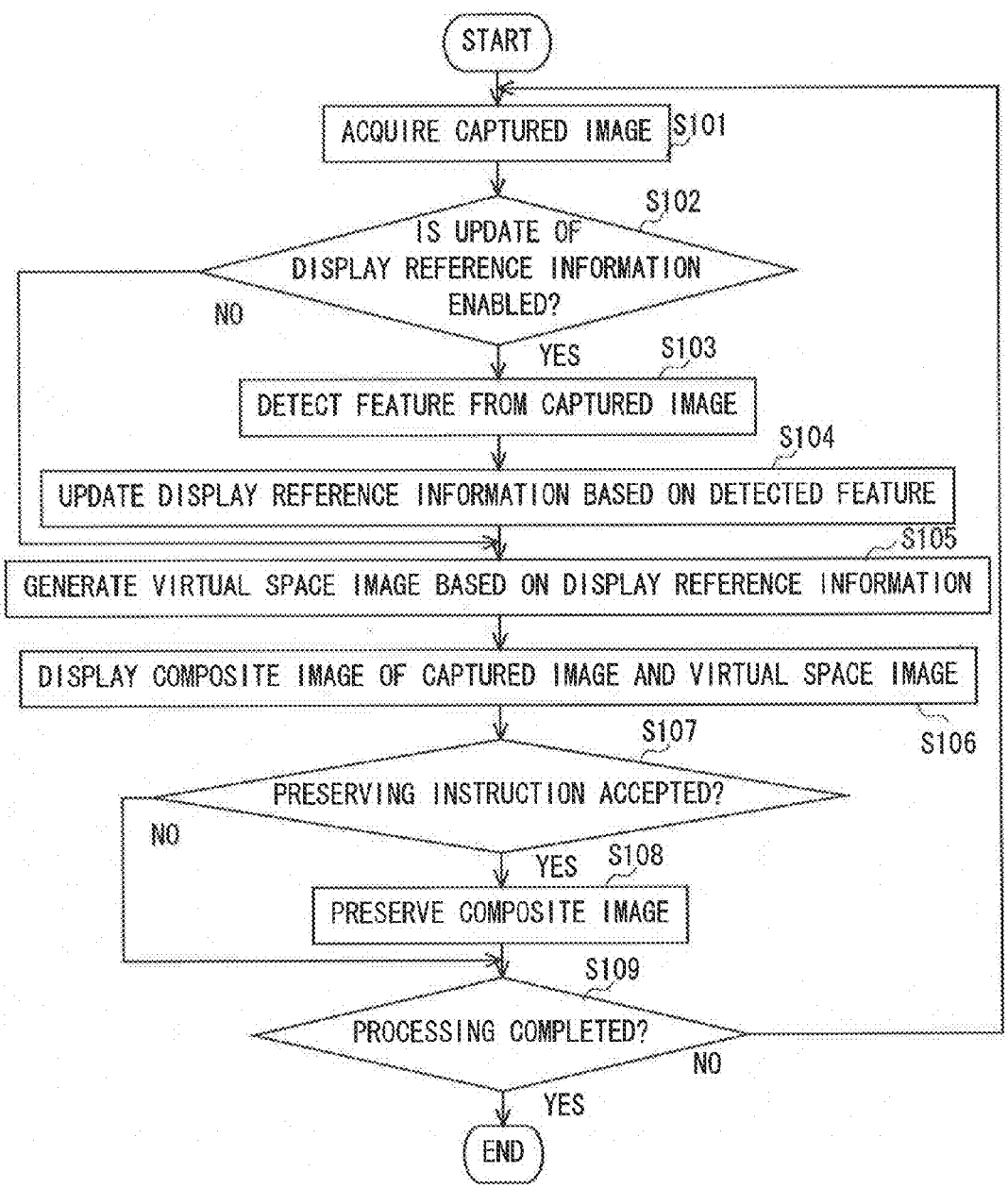
FIG. 3 shows an example non-limiting flow chart showing a flow of image processing.

FIG. 3 is a flow chart showing a flow of image processing according to the present embodiment. The image processing shown in the present flow chart is started when a user operation for activating an imaging function using the imaging device 15 is accepted by the information processing device 1. Information stored by the display reference information storing unit 24 is initialized upon activation of the imaging function. Therefore, the display reference information storing unit 24 does not store display reference information upon activation of the imaging function. Moreover, processing according to the present embodiment is repetitively executed for each frame divided at 60 frames/second.

In steps S101 and S102, a captured image is acquired and a judgment is made on whether or not update of display reference information is enabled. The captured image acquiring unit 21 acquires a captured image captured by the imaging device 15 (step S101). Subsequently, the update interrupting unit 27 judges whether or not update of display reference information is enabled. When it is judged that update of display reference information is not enabled (update of display reference information is disabled), in order to interrupt update of display reference information by the display reference information updating unit 23, the processing skips steps S103 and S104 and advances to step S105. On the other hand, when it is judged that update of display reference information is enabled, in order to perform update of display reference information by the display reference information updating unit 23, the processing advances to step S103.

In step S103, a marker 3 is detected from the captured image. When a captured image is acquired, the feature detecting unit 22 detects all markers 3 corresponding to a marker image included in marker information from the captured image as features of a captured space. Detection of the markers 3 can be performed using a general image recognition engine. Subsequently, processing proceeds to step S104.

In step S104, a reference acquiring process is executed for each marker 3. Based on the detected marker 3, the display reference information updating unit 23 acquires position and posture information of the marker 3 in a real space for each marker 3 and updates display reference information of each marker 3. More specifically, the display reference information updating unit 23 acquires a position and a posture of the marker 3 in a real space based on a position of the marker 3 in the captured image, a result of a comparison between a marker size included in marker information and a size of the marker 3 included in the captured image, and a distortion of the marker 3 in the captured image with respect to a marker image included in the marker information. The display reference information updating unit 23 updates display reference information with the position and posture information of the marker in a real space acquired in this manner. Subsequently, processing proceeds to step S105.

In step S105, an image of a virtual space is generated. The image generating unit 25 renders an image of a virtual space including one or more virtual objects of which at least any of a position and a posture has been determined according to display reference information and which is arranged in a marker coordinate system from a perspective of a virtual camera arranged in the marker coordinate system at a same position as the imaging device 15. Object data for rendering the virtual object is acquired from object information. Moreover, the virtual object may be animated by varying the virtual object every frame or every few frames. Examples of the animation include a character of the virtual object changing a facial expression or moving around. Subsequently, processing proceeds to step S106.

In step S106, a display process is executed. The display control unit 26 generates a composite image in which the image of the virtual space is superimposed on the captured image, and outputs the composite image to the display 16 to have the composite image displayed. Subsequently, processing proceeds to step S107.

In steps S107 and S108, the composite image is preserved according to a composite image preserving instruction. In response to a user operation performed in order to issue an instruction for preserving an image (step S107), the composite image preserving unit 28 preserves the composite image (step S108). At this point, the composite image may be preserved as a still image or as a moving image. On the other hand, if a user operation performed in order to issue an instruction for preserving the image has not been accepted, the composite image is not preserved (step S107). Subsequently, processing proceeds to step S109.

As described earlier, the processing shown in the present flow chart is executed for each frame. Therefore, the processing shown in the present flow chart is repetitively executed starting from step S101 on a regular basis until the imaging function is terminated based on a user operation or the like (step S109). Due to the execution of the image processing described above, update of display reference information of a virtual object which is updated based on the marker 3 can be disabled once the display reference information reaches a state that is desirable to a user, a capturing position or an angle with respect to a real space can be adjusted while update is being disabled, and a composite image of the virtual object in a desired state and the real space in a desired state can be obtained.

Figure 4:
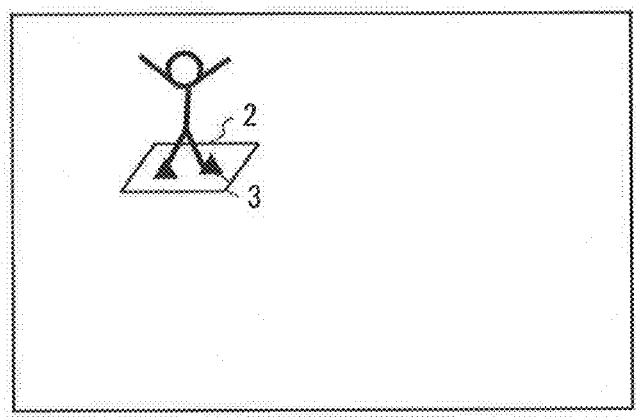
FIG. 4 shows an example non-limiting diagram showing an example of a display screen when update of display reference information is enabled.
Figure 5:
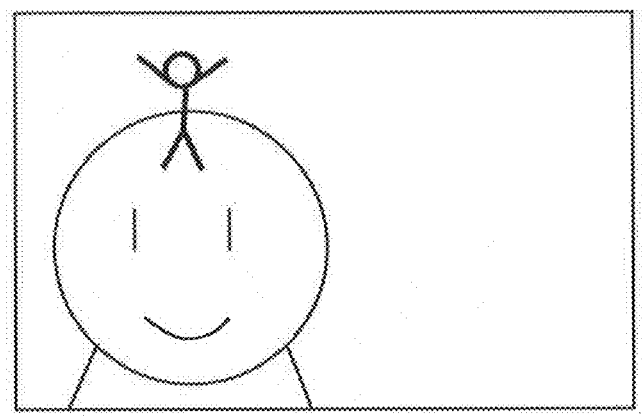
FIG. 5 shows an example non-limiting diagram showing an example of a display screen when update of display reference information is disabled.

FIGS. 4 and 5 are diagrams showing examples of a display screen of the display 16 when a composite image is acquired by the image processing according to the present embodiment. More specifically, FIG. 4 is a diagram showing an example of a display screen when update of display reference information is enabled, and FIG. 5 is a diagram showing an example of a display screen when update of display reference information is disabled.

As described earlier, information stored by the display reference information storing unit 24 is initialized upon activation of the imaging function. Accordingly, the display reference information storing unit 24 does not store display reference information upon activation of the imaging function. Therefore, when a marker is not included in a captured image immediately after the imaging function of the information processing device 1 is activated in response to a user operation, a virtual object is not arranged in a virtual space and the captured image obtained by the imaging device 15 is displayed on the display 16.

When a marker 3 enters an imaging range of the imaging device 15 and the marker 3 is included in a captured image, the display reference information updating unit 23 updates display reference information based on the marker 3 detected by the feature detecting unit 22 and the image generating unit 25 renders a virtual object at a position and in a posture corresponding to the marker 3. Therefore, a composite image in which the virtual object is superimposed on the marker 3 is displayed on the display 16 (refer to FIG. 4).

Since update of display reference information is enabled in an initial state, a user can adjust the imaging device 15 or the marker 3 in this state to put a position and a posture of the virtual object displayed on the display 16 in a desired state. In addition, once the position and the posture of the virtual object are in the desired state, the user disables update of display reference information by performing a predetermined operation. When update of display reference information is disabled, the virtual object is displayed according to last updated display reference information. Even if a position or a posture of a marker in the captured image varies or a marker is no longer included in the captured image, the virtual object is maintained in the state desired by the user (refer to FIG. 5).

When update of display reference information is disabled, the user can adjust a position or an angle of the imaging device 15 to place a captured image in a desired state. In addition, by performing an operation to preserve the composite image at a timing where both a state of the virtual object and a state of the captured image reach desired states, the user can preserve a desired composite image. For example, FIG. 5 shows a state where a character of a virtual object is on top of the user's head. Besides the above, with the information processing device 1 according to the present embodiment, images that cannot be obtained by conventional devices in which a virtual object is always displayed on a marker can be readily obtained such as a composite image showing a character of a virtual object standing upside down on a ceiling or a composite image showing characters of a plurality of virtual objects lined up on a cake.

Variations of Embodiment

Variations applicable to the embodiment described above will now be described.

The display 16 included in the information processing device 1 may be a display device which can be stereoscopically viewed with the naked eye. For example, a display device adopting a lenticular system or a parallax barrier system is used so that a left-eye image and a right-eye image, which are alternately displayed in a horizontal direction, are respectively viewed separately by the left eye and the right eye. Alternatively, the display 16 may be a display device capable of switching between a stereoscopic display mode which displays stereoscopically viewable images and a planar display mode which displays images in a planar view (which displays planar view images). For example, the display modes may be switched using a 3D adjustment switch (not shown).

In this case, in order to obtain a left-eye captured image and a right-eye captured image to enable stereoscopic view, an imaging device capable of stereo photography is used as the imaging device 15. In addition, in order to also make a virtual space image a stereoscopically viewable image, the image generating unit 25 generates a left-eye virtual image and a right-eye virtual image using two virtual cameras corresponding to the stereo camera of the imaging device 15. Furthermore, the display control unit generates a left-eye composite image and a right-eye composite image, and outputs the composite images to a stereoscopically viewable display 16.

Furthermore, the imaging device 15 may be an imaging device capable of capturing images of the front and the rear of the display 16 by including an outer imaging unit provided so as to be capable of capturing an image along a line of sight of a user viewing the display 16 and an inner imaging unit provided so as to be capable of capturing an image of the user viewing the display 16. By providing the outer imaging unit and the inner imaging unit described above, a composite image in which a virtual object and the user viewing the display 16 are shown together can be generated by adjusting display reference information of the virtual object to a desired state using the outer imaging unit and the marker 3 and then switching to the inner imaging unit in a state where update of the display reference information has been disabled.

In addition, a configuration may be adopted which enables a display posture of a virtual object to be adjusted based on a posture of the imaging device 15 when update of display reference information is disabled. In this case, a position and a posture of the imaging device 15 can be detected using an acceleration sensor, an angular velocity sensor, or the like. The information processing device 1 calculates a posture of the imaging device 15 based on an output from the acceleration sensor, the angular velocity sensor, or the like to adjust a display posture of the virtual object.

For example, when display reference information is determined by placing a marker horizontally on a table, even if update of the display reference information is disabled in a state where a virtual object of a character is stood upright, a change in an imaging angle of the imaging device 15 results in the character becoming inclined relative to a real space (the character is no longer upright). In this case, if a display posture of the virtual object is to be adjusted based on a posture of the imaging device 15, a display in which the character is stood upright can be obtained while keeping a position of the character in a virtual space fixed.

Accordingly, even in a case where, after positioning a virtual object, a posture of an imaging device varies while update of display reference information is being disabled, a posture of the virtual object can be maintained "with respect to a real space".

In addition, while an example in which a marker coordinate system is used as display reference information has been described in the embodiment above, the display reference information may be any information as long as the information is obtained from a real space and can be used as a reference of at least any of a position and a posture of a virtual object in a virtual space. For example, the display reference information may be a captured image itself. When a captured image is used as display reference information, the image generating unit 25 extracts a display reference of a virtual object from a captured image stored as display reference information for each frame.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored thereon an image processing program which, when executed by a computer communicably connected to an imaging device, causes the computer to perform operations comprising:
    updating, in accordance with change of information obtained from a first image of a real space captured by the imaging device from a first position or direction, at least a position, in a virtual space, of a virtual object arranged in the virtual space;
    generating an image of a virtual space in which the virtual object is arranged in accordance with at least the updated position;
    causing a display device to display a first superimposed image in which the image of the virtual space is superimposed on the first image of the real space;
    disabling the updating at least a position of the virtual object when a predetermined condition is met; and
    while the updating is disabled, causing the display device to display a second superimposed image in which an image of the virtual space having the virtual object arranged in accordance with at least a position updated by said updating before the updating is disabled is superimposed on a second image of the real space captured by the imaging device after the updating is disabled from a second position or direction different from the first position or direction.

2. The non-transitory computer-readable storage medium according to claim 1, further causing the computer to perform operations
    storing display reference information that is used as a reference for at least any of a position and a posture, in a virtual space, of a virtual object arranged in the virtual space;
    updating at least any of a position and a posture of the virtual object in the virtual space by updating the stored display reference information based on information obtained from the real space,
    generating an image of a virtual space including a virtual object arranged according to the display reference information; and
    disabling an update of at least any of a position and a posture, in the virtual space, of the virtual object by disabling an update of the display reference information when the predetermined conditions are met.

3. The non-transitory computer-readable storage medium according to claim 2, further causing the computer to perform operations
    detecting a feature in a real space that enables at least any of a position and a posture in the real space to be identified; and
    updating the stored display reference information based on the feature.

4. The non-transitory computer-readable storage medium according to claim 3, further causing the computer to perform operations
    acquiring a captured image that is captured by an imaging device; and
    detecting from the captured image a feature in a space captured in the captured image.

5. The non-transitory computer-readable storage medium according to claim 4, wherein
    enabling a user to view an image of the virtual space superimposed on a real space by causing the display device to display a composite image in which an image of the virtual space is superimposed on the captured image.

6. The non-transitory computer-readable storage medium according to claim 5, further causing the computer to perform operations
    preserving the composite image.

7. The non-transitory computer-readable storage medium according to claim 6, wherein
    preserving the composite image in response to a user operation performed in order to issue an instruction for preserving an image.

8. The non-transitory computer-readable storage medium according to claim 1, wherein the computer is further configured to disable an update of the display reference information on a condition that a predetermined operation is performed by a user.

9. An image processing device comprising:
    a memory; and
    at least one processor communicably coupled to the memory, and configured to perform operations comprising:
    updating, in accordance with change of information obtained from a first image of a real space captured by an imaging device from a first position or direction, at least a position, in a virtual space, of a virtual object arranged in the virtual space;
    generating an image of a virtual space in which the virtual object is arranged in accordance with at least the updated position;
    causing a display device to display a first superimposed image in which the image of the virtual space is superimposed on the first image of the real space;
    disabling the updating at least a position of the virtual object when a predetermined condition is met; and
    while the updating is disabled, causing the display device to display a second superimposed image in which an image of the virtual space having the virtual object arranged in accordance with at least a position updated by said updating before the updating is disabled is superimposed on a second image of the real space captured by the imaging device from a second position or direction different after the updating is disabled from the first position or direction.

10. The image processing device according to claim 9, wherein the at least one processor is further configured to perform operations comprising:
- storing display reference information that is used as a reference for at least any of a position and a posture, in a virtual space, of a virtual object arranged in the virtual space;
- updating at least any of a position and a posture of the virtual object in the virtual space by updating the stored display reference information based on information obtained from the real space;
- generating an image of a virtual space including a virtual object arranged according to the display reference information; and
- disabling an update of at least any of a position and a posture, in the virtual space, of the virtual object by disabling an update of the display reference information when the predetermined conditions are met.

11. An image processing system comprising:
- a component including a feature that enables at least a position relative to an imaging device to be identified by being captured by the imaging device; and
- an image processing device including at least one processor and being connected to the imaging device, wherein the image processing device is configured to perform operations comprising:
- updating at least a position, in a virtual space, of a virtual object arranged in the virtual space in accordance with a change of the component which is in a first image of the real space arranged in a real space and which is captured by the imaging device from a first position or direction;
- generating an image of a virtual space in which the virtual object is arranged in accordance with the updated position;
- causing a display device to display a first superimposed image in which the image of the virtual space is superimposed on the first image of the real space;
- disabling the updating at least a position of the virtual object when a predetermined condition is met; and
- while the updating is disabled, causing the display device to display a second superimposed image in which an image of the virtual space having the virtual object arranged in accordance with at least a position updated by the updating before the updating is disabled is superimposed on a second image of the real space captured by the imaging device from a second position or direction different after the updating is disabled from the first position or direction.

12. The image processing system according to claim 11, wherein the image processing device is further configured to
- store display reference information that is used as a reference for at least any of a position and a posture, in a virtual space, of a virtual object arranged in the virtual space;
- update at least any of a position and a posture of the virtual object in the virtual space by updating the stored display reference information based on information obtained from the real space;
- generating an image of a virtual space including a virtual object arranged according to the display reference information; and
- disable an update of at least any of a position and a posture, in the virtual space, of the virtual object by disabling an update of the display reference information when the predetermined conditions are met.

13. An image processing method in which a computer executes operations comprising:
- updating, in accordance with change of information obtained from a first image of a real space captured by an imaging device from a first position or direction, at least a position, in a virtual space, of a virtual object arranged in the virtual space;
- generating an image of a virtual space in which the virtual object is arranged in accordance with the updated position;
- causing a display device to display a first superimposed image in which the image of the virtual space is superimposed on the first image of the real space;
- disabling the updating at least a position of the virtual object when a predetermined condition is met; and
- while the updating is disabled, causing the display device to display a second superimposed image in which an image of the virtual space having the virtual object arranged in accordance with at least a position updated by said updating before the updating is disabled is superimposed on a second image of the real space captured by the imaging device from a second position or direction different after the updating is disabled from the first position or direction.

14. The image processing method according to claim 13, wherein the computer is further configured to store display reference information that is used as a reference for at least any of a position and a posture, in a virtual space, of a virtual object arranged in the virtual space;
- wherein the updating includes updating at least a position of the virtual object in the virtual space by updating the stored display reference information based on information obtained from the real space;
- wherein the generating includes arranging an image of a virtual space including a virtual object according to the display reference information is generated; and
- wherein the disabling includes disabling an update of at least a position, in the virtual space, of the virtual object by disabling an update of the display reference information in the updating step when the predetermined conditions are met.

* * * * *